US 9,971,900 B1

United States Patent
Koropoff (10) Patent No.: US 9,971,900 B1
(45) Date of Patent: May 15, 2018

(54) ZERO-COPY DATA PRIVACY AND INTEGRITY

(71) Applicant: Brian H. Koropoff, Bellevue, WA (US)

(72) Inventor: Brian H. Koropoff, Bellevue, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 135 days.

(21) Appl. No.: 15/198,901

(22) Filed: Jun. 30, 2016

(51) Int. Cl.
*G06F 12/14* (2006.01)
*G06F 21/60* (2013.01)
*H04L 9/06* (2006.01)
*G06F 9/54* (2006.01)

(52) U.S. Cl.
CPC ............. *G06F 21/60* (2013.01); *G06F 9/545* (2013.01); *G06F 21/602* (2013.01); *H04L 9/0631* (2013.01); *H04L 9/0643* (2013.01)

(58) Field of Classification Search
CPC ..... G06F 9/545; G06F 21/602; H04L 9/0631; H04L 9/0643
USPC ............................................ 713/189; 726/26
See application file for complete search history.

(56) References Cited

U.S. PATENT DOCUMENTS

| 6,070,198 A * | 5/2000 | Krause ................... G06F 9/4426 712/E9.083 |
| 6,412,069 B1 * | 6/2002 | Kavsan ..................... G06F 8/60 713/164 |
| 9,047,018 B1 * | 6/2015 | Ananthabhotla ..... G06F 3/0613 |
| 9,092,426 B1 * | 7/2015 | Bathija ............... G06F 12/1081 |
| 9,787,792 B1 * | 10/2017 | Craft ....................... H04L 69/26 |
| 9,836,431 B2 * | 12/2017 | Huang .................. G06F 15/173 |
| 2005/0005101 A1 * | 1/2005 | Yenduri .................. G06F 21/57 713/164 |
| 2007/0291778 A1 * | 12/2007 | Huang .................. H04L 1/1614 370/410 |
| 2017/0264684 A1 * | 9/2017 | Spillane .............. H04L 67/1095 |

* cited by examiner

*Primary Examiner* — Samson Lemma (57) ABSTRACT

Implementations are provided herein for maintaining a set of cryptographic algorithms in the kernel. User space applications can call on the set of cryptographic logic algorithms in the kernel to perform computations on data payloads residing in kernel space memory without having to copy the data payloads out of kernel space memory into user space memory. The results of the cryptographic logic being applied to data payloads can be packaged together with message framing originating from user space and data payloads in the kernel space as a protocol message that can sent through the network stack to a socket. It can be appreciated that by retaining protocol logic in user space, just the cryptographic algorithms need be added to the kernel.

20 Claims, 8 Drawing Sheets

ZERO-COPY DATA PRIVACY AND INTEGRITY

FIELD OF THE INVENTION

This invention relates generally to processing data, and more particularly to systems and methods for more efficient zero copy processes between user space and kernel space that still maintains data privacy and data integrity properties.

BACKGROUND OF THE INVENTION

In most Unix style operating systems, when data is sent or received over a network, the data originates or terminates in user space accessible memory. When sending data, the data is generally copied from user space memory to a buffer space allocated to the kernel, and then eventually sent down the networking stack to a physical network device where, via a device driver, the data is sent via direct memory access ("DMA"). When receiving data, the hardware driver DMA's the data into a buffer space allocated to the kernel. An application, for example, a Server Message Block ("SMB") server, can request that the data be copied from the buffer space allocated to the kernel to user space memory. Similarly, when a process wants to write data to disk, data residing in user space accessible memory can get copied to a page cache in the kernel, and eventually written to disk from the page cache.

In an operating system that supports multiple networking protocols, clients of those unique protocols expect data to be packaged according to the protocol specification. For example, if an SMB client and a Network File System ("NFS") client both ask to read the same file, the data payload, e.g., the actual file data, will likely be the same when serving both requests. However, the protocol specifications, in general, require the data payload to be packaged with native protocol framing that can include metadata including checksum data or transformations to the data payload such as encrypted data payload or a compressed data payload. In one example, a checksum can be generated for each data payload and then be included in the message framing such that once the client receives the data payload and the checksum, the client can use the received data payload to independently compute its own checksum and then compare the computed checksum to the checksum received in the message framing to determine if any errors were introduced into the data payload during transmission.

Different protocols can, for example, use different checksum hash formulas, different encryption algorithms to protect data payloads, and different compression algorithms to compress data. In many of these scenarios, there is a requirement to make a computation on the data payload to generate at least a portion of the protocol message framing information. For example, it can require that the data payload be first transferred to user space accessible memory, then the user space native protocol head can make the necessary computations on the data payload to generate the proper message framing, and then the message framing and the data payload can be combined and copied to kernel space memory for eventual transfer to a client. Thus, every time a protocol head sends or receives data, it is likely necessary for the data to be copied twice, e.g., once from kernel space to user space and a second copy from user space back to kernel space. In large scale file systems, this can consume large amounts of computational and memory resources. It can be appreciated that zero-copy mechanisms can used to avoid copying data between user space and kernel space; however, they are not usable when a computation needs to be performed over the data. Thus, it can be appreciated that there exists a need for a zero-copy process that can provide for the necessary computation of protocol framing information without requiring a data payload to be copied to user space and then back to kernel space before being sent down the networking stack in the kernel for DMA to the network.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

In accordance with an aspect, a set of cryptographic algorithms can be maintained in the kernel space of the operating system. A first protocol head in the user space of the operating system can receive a request to send a data payload over a data socket. The data payload can be read from at least one disk to a kernel space memory. The protocol head can instruct the kernel to perform a subset of the set of cryptographic logic on the data payload in the kernel space memory. The kernel can perform the subset of the set of cryptographic logic on the data payload, wherein the performing generates at least one of a cryptographic result and a transformed data payload. In response to generating the cryptographic result, the cryptographic result can be copied to a user space memory of the operating system. A message framing can be generated by the protocol head, wherein the message framing includes at least the cryptographic result, and wherein the message framing is stored in the user space memory. The kernel can be instructed to send a protocol message based on a user space supplied vector wherein the user space supplied vector includes the message framing in the user space memory, the second cryptographic result, and one of the data payload in the kernel space memory or the transformed data payload in the kernel space memory. The protocol message can be assembled in kernel memory space based on the user space supplied vector. The protocol message can be sent over the data socket.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

Implementations are provided herein for maintaining a set of cryptographic algorithms in the kernel. User space applications can call on the set of cryptographic logic algorithms in the kernel to perform computations on data payloads residing in kernel space memory without having to copy the data payloads out of kernel space memory into user space memory. The results of the cryptographic logic being applied to data payloads can be packaged together with message framing originating from user space and data payloads in the kernel space as a protocol message that can sent on a socket. It can be appreciated that by retaining protocol logic in user space, just the cryptographic algorithms need be added to the kernel.

Figure 1:
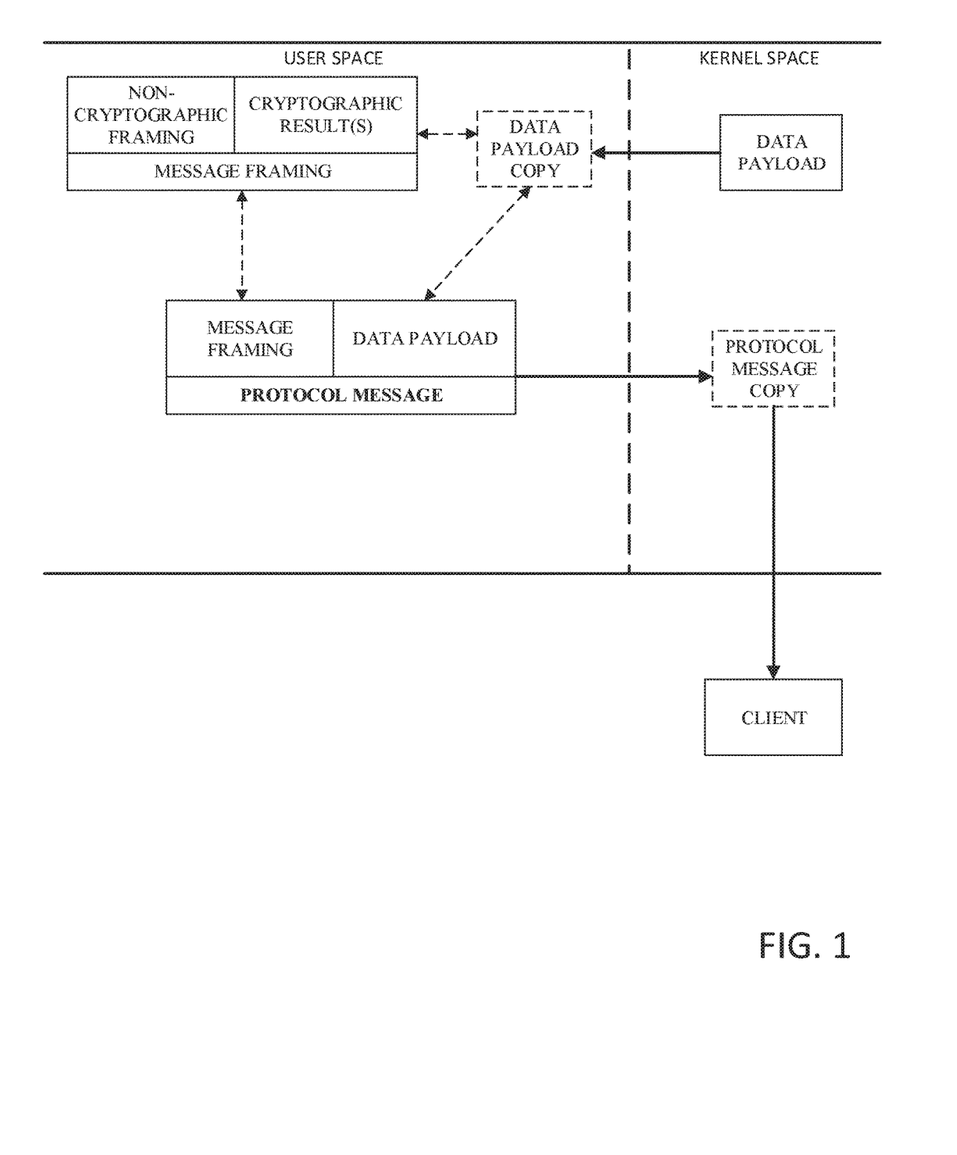
FIG. 1 illustrates the practice of copying data between kernel space and user space in generating a protocol message.
Figure 2:
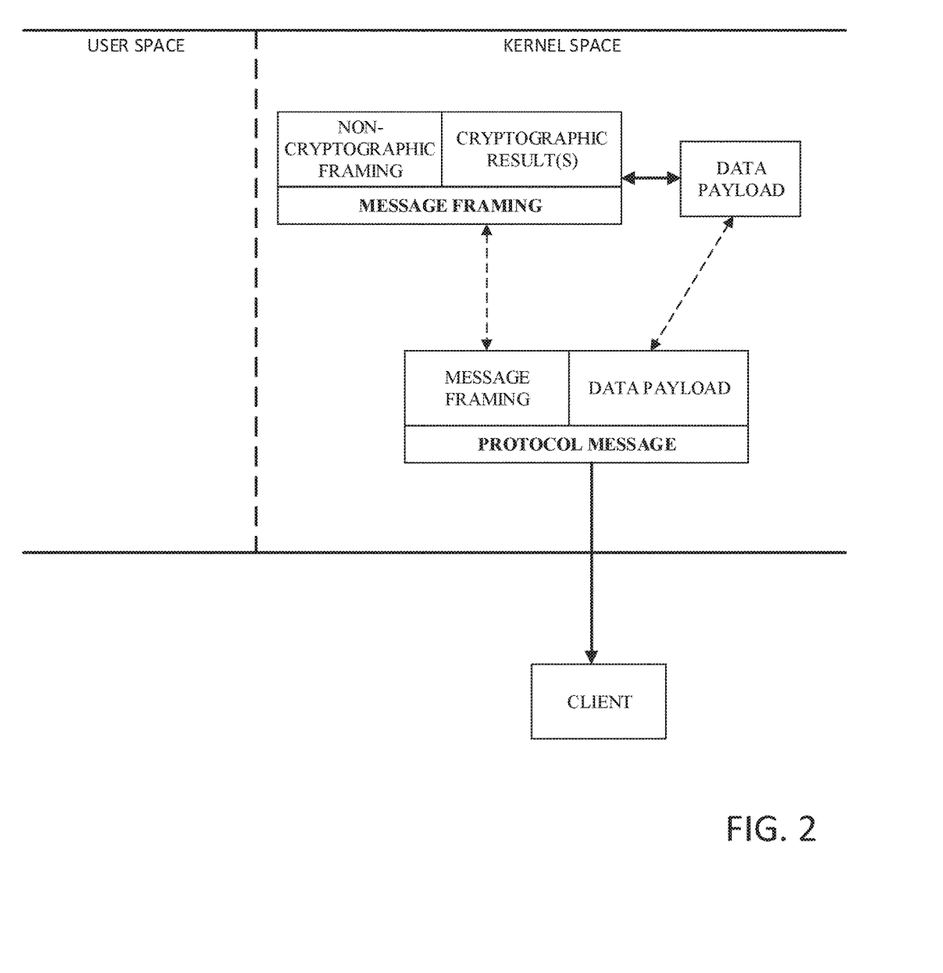
FIG. 2 illustrates an example of moving the entire protocol stack into the kernel to accomplish zero-copying of data when generating a protocol message.
Figure 3:
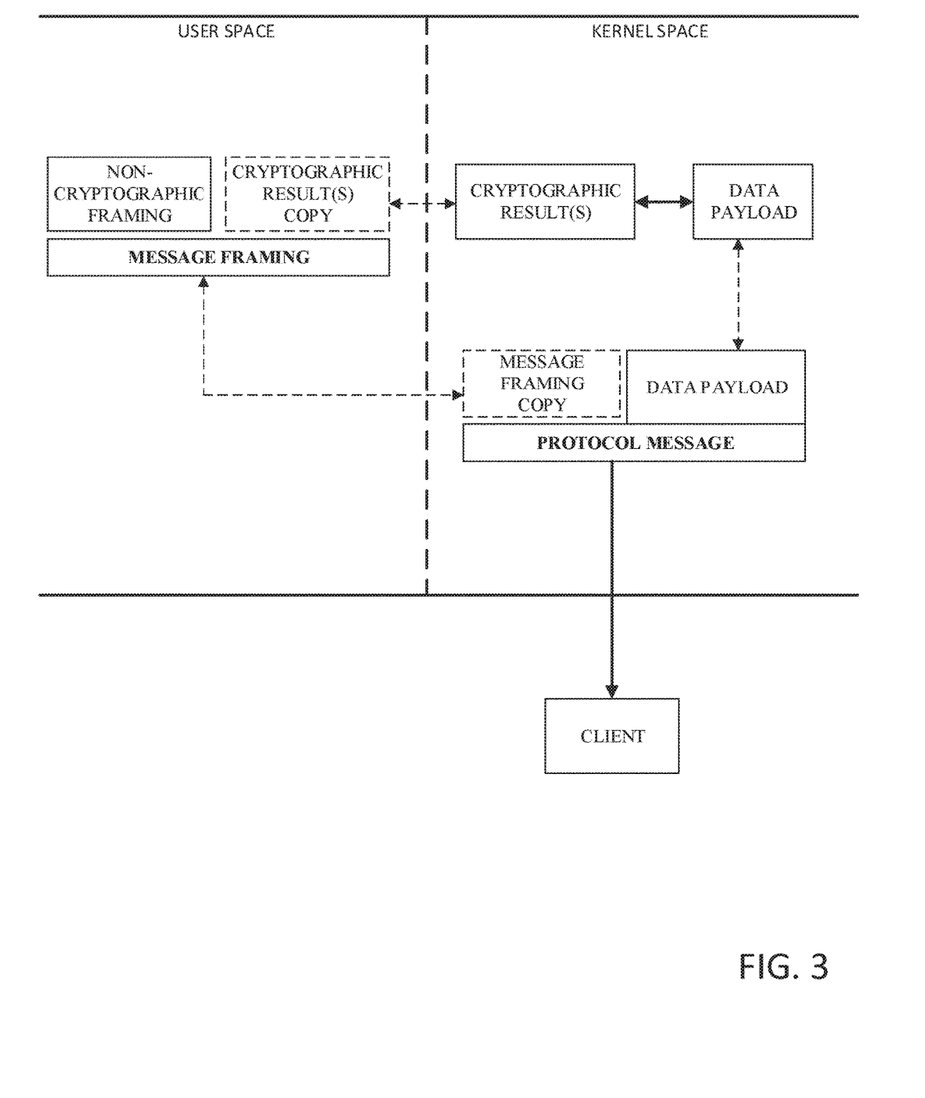
FIG. 3 illustrates an example of zero copy of a data payload when generating a protocol message in accordance with implementations of this disclosure.

Using the SMB protocol as an example, an SMB protocol head residing in user space has been asked by an SMB client to send a data payload to the SMB client. To prepare the message framing, when SMB signing is required, a hash is required to be generated as a part of the message framing. For example, when using SMB3, a 16-byte hash using AES-128-CMAC over the entire protocol message must be generated and included as a part of the message framing. In another example, when using SMB2, a 32-byte hash using HMAC-SHA256 over the entire protocol message must be generated and included as a part the message framing. In another example, in SMB3, messages can be encrypted using the AES-128-CCM or AES-128-GCM algorithms and the entire protocol message must be encrypted. Thus, in the case of signing or encryption, a cryptographic algorithm must be applied over at least the data payload and in some cases over the data payload and portions of the message framing. FIGS. 1-3, discussed in greater detail below, describe differing approaches for how to compute these necessary cryptographic functions on a data payload.

FIG. 1 illustrates the practice of copying data between kernel space and user space in generating a protocol message. In this example, a data payload is first copied from disk to a kernel buffer memory space for fast access. The data payload is then copied to user space so that the protocol logic can use the contents of the data payload copy to compute the necessary cryptographic result(s) and non-cryptographic framing required to create a valid protocol message. For example, non-cryptographic framing can include metadata required by a protocol specification that accompanies each protocol message sent under the specification. Non-cryptographic framing can be included as a header to the protocol message, a footer to the protocol message, or elsewhere as prescribed by the specific protocol specification. The message framing and the data payload can then be packaged together as a protocol message and copied back into kernel space memory for eventual delivery to the protocol client. It can be appreciated that in this example, the data payload is copied from kernel space memory to user space memory and then the protocol message is copied from user space memory to kernel space memory before being sent to the protocol client.

FIG. 2 illustrates an example of moving the entire protocol stack into the kernel to accomplish zero-copying of data when generating a protocol message. In this example, the protocol logic resides in the kernel space providing for computing all necessary non-cryptographic framing and cryptographic result(s) in kernel space such that the data payload does not need to be copied to user space memory as described with respect to FIG. 1. While this does effectively give zero copy performance, it's a radical architecture change for most operating systems. It can be appreciated that adding protocol logic into the kernel can increase security vulnerabilities to the operating system. In addition, for an operating system that supports multiple protocols, such as SMB, NFS, Hadoop Distributed File System, Object protocols, etc., to support zero copy for each protocol would require adding the protocol logic for every supported protocol into the kernel. In addition, as stated above with respect to SMB2 and SMB3, as protocol specifications evolve into future versions, their specifications change relating to what cryptographic result(s) need be included within message framing, how those message framings are constructed, and whether data payloads need to be transformed to support encryption and/or compression. This would require modifications to the operating system kernel for each new version of existing protocol specifications you would want the operating system to support. It can be appreciated this is not desirable as modifications to the kernel can increase security vulnerabilities and likely requires greater engineering resources, in general, than adding a new protocol head to user space. Thus, it can be appreciated that adding protocol applications into the kernel does not scale well with multiple protocols.

FIG. 3 illustrates an example of zero copy of a data payload when generating a protocol message in accordance with implementations of this disclosure. User space protocol logic can generate any non-cryptographic framing necessary to construct the message framing in user space. Any portions of the message framing that require cryptographic logic be performed on the data payload and/or message framing can be generated separately in kernel space using a lightweight cryptographic component that resides in the kernel and strictly performs hashing and encrypting functions on configurable chunks of data. The non-cryptographic framing can then be copied from user space memory to kernel space memory in order to assemble a complete message. Thus, it can be appreciated that the data payload itself need not be copied from kernel space to user space, and that protocol logic can remain in user space. In one example, the protocol head passes a vector which specifies a sequence of mixed user space buffers and kernel buffers. For encryption or decryption, the data can be modified in place in the buffer, and a digest can be returned. This can be accomplished with a single call to a cryptographic component residing in the kernel.

In one implementation, a new file descriptor (opaque handle) that refers to resources in the kernel can be established that user space logic can use without actually accessing the data in the kernel directly.

In one implementation, a vectored (e.g., scatter-gather) approach can be used to stitch the relevant portions of a protocol message together and then send it out via the socket. For example, the kernel can be instructed to send a protocol message over a socket, where the contents of the protocol message are determined by a vector provided by user space that specifies a linear sequence of any mixture of kernel buffers or user space buffers. The user space buffer portions can be copied into the kernel, and the entire message as defined by the vector can be assembled and queued for transmission in the kernel. This can be accomplished from a single call from user space.

Figure 4:
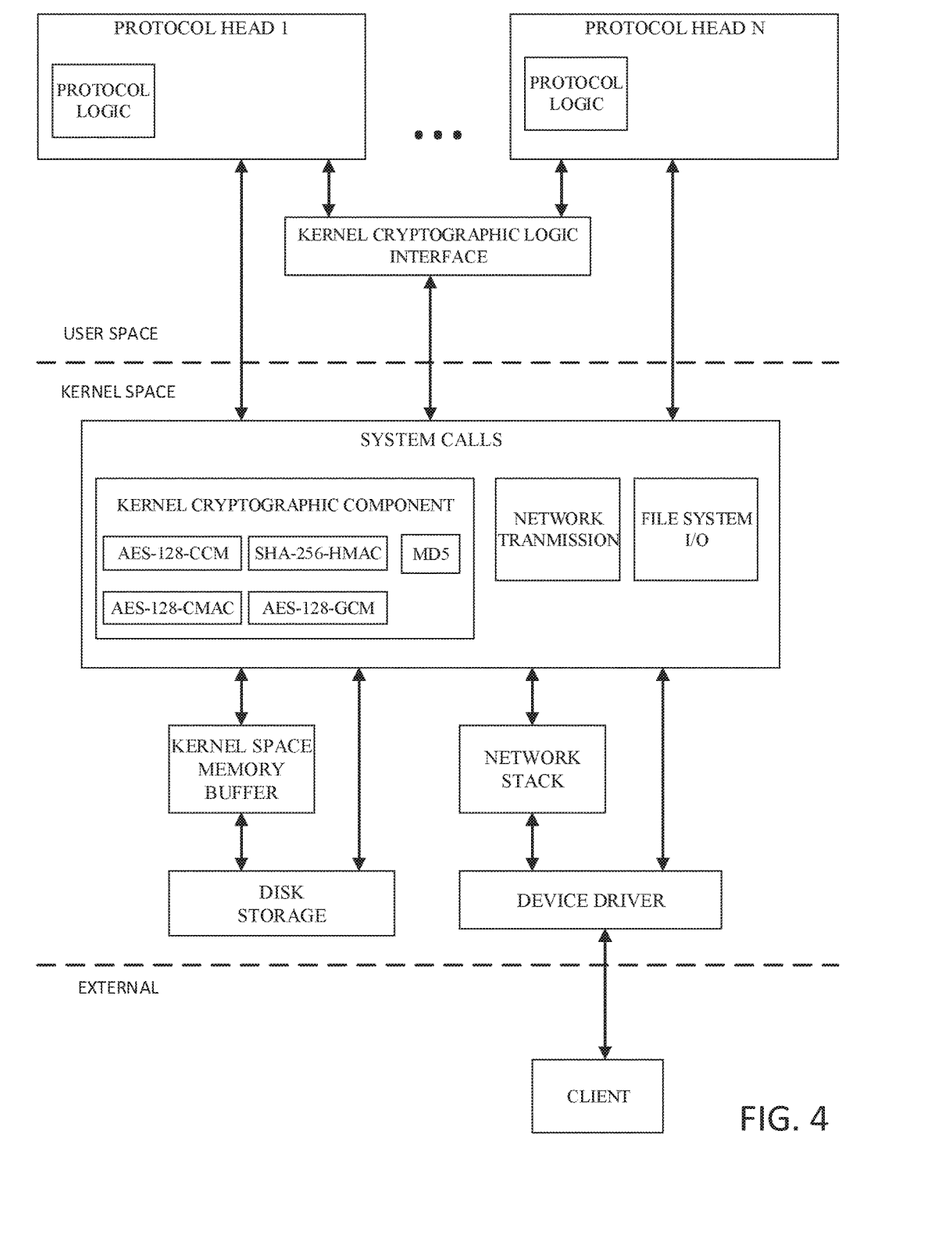
FIG. 4 illustrates an example diagram of user space components, kernel space components, and an external client in accordance with implementations of this disclosure.

Referring now to FIG. 4, there is illustrated an example diagram of user space components, kernel space components, and an external client in accordance with implementations of this disclosure. Protocol Head 1 and Protocol Head N (where "N" is a positive integer greater than 1) can both have access to a kernel cryptographic logic interface. This generic interface can be accessed by any user space protocol logic and allows the protocol logic to choose the cryptographic logic they want the kernel cryptographic component to apply to a chunk of data in kernel space memory. Any user space protocol logic then need only be programmed to modify the protocol logic generation process to utilize any necessary cryptographic functions within the kernel to avoid copying of a data payload between kernel space memory and user space memory.

In one implementation, a kernel cryptographic component can be used to generate message digests using established hashing functions on a configurable set of data residing within the kernel space memory buffer. It can be appreciated that hashing algorithms themselves rarely change over time, even if the protocol specifications evolve and message syntax changes. Thus, a kernel space cryptographic component that has a wide range of cryptographic hashing algorithms will likely support most protocols, as how the output of those cryptographic functions are used can be still be managed, and edited, within the user space protocol application. FIG. 4 depicts AES-128-CCM, AES-128-CMAC, AES-128-GCM, SHA-256-HMAC, and MD5 as examples only and it can be appreciated that other hashing and/or encryption algorithms, including those yet to be established, can be added to the kernel cryptographic component to support protocol applications.

Figure 5:
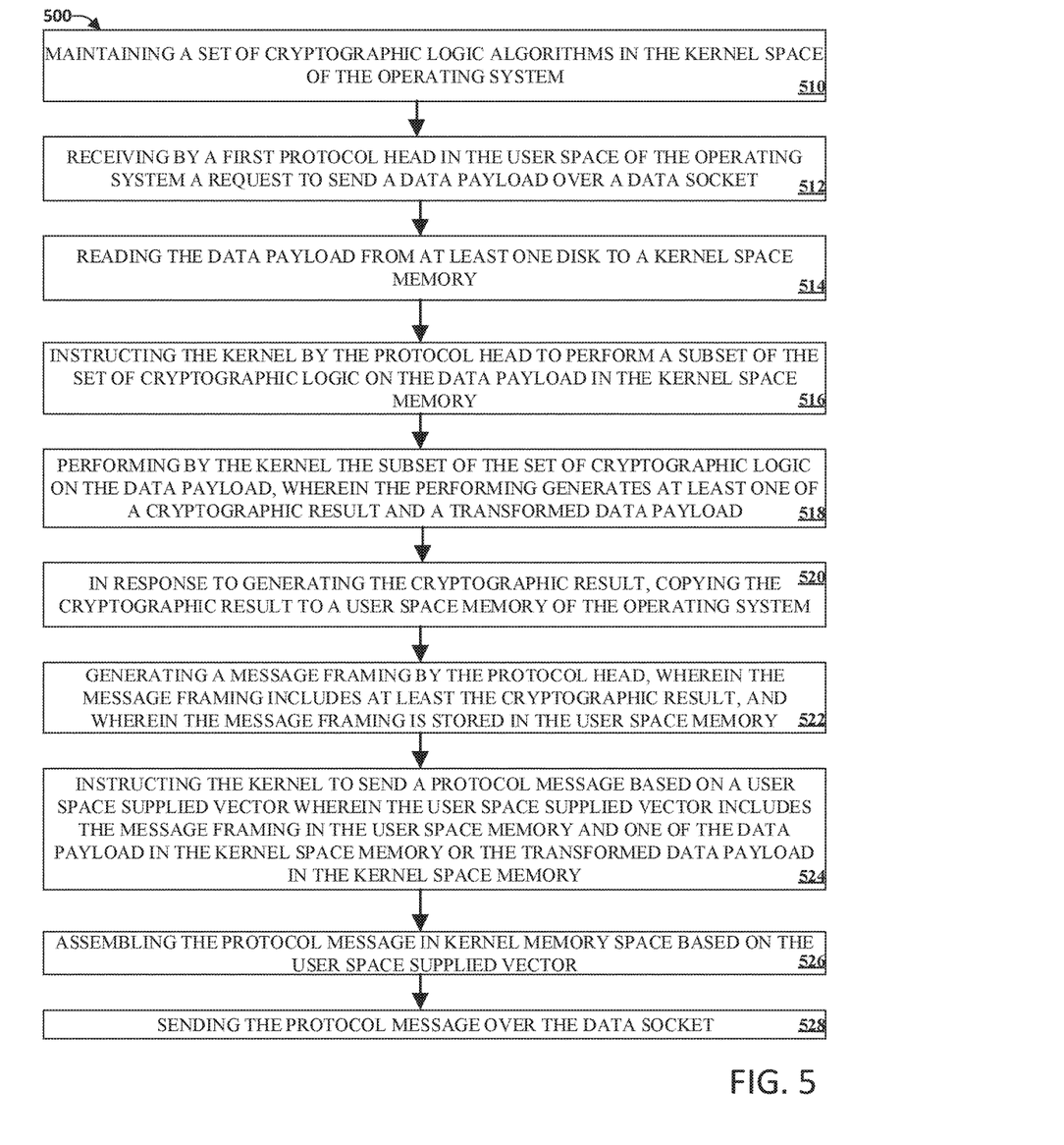
FIG. 5 illustrates an example method for zero-copy of a data payload for sending to a client by generating cryptographic results in the kernel in accordance with implementations of this disclosure.
Figure 6:
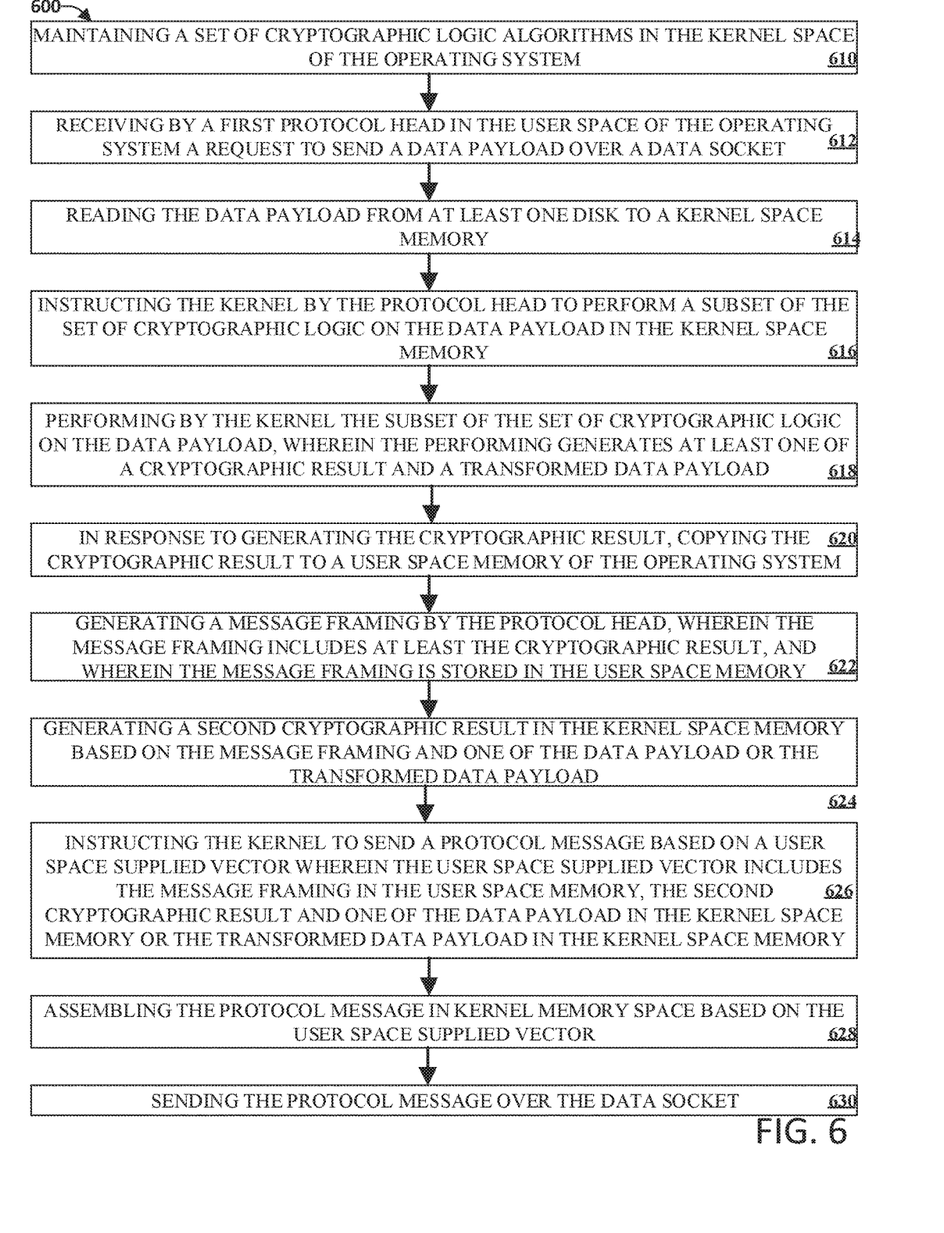
FIG. 6 illustrates an example method for zero-copy of two data payloads for sending by two different protocols in parallel by generating cryptographic results in the kernel in accordance with implementations of this disclosure.
Figure 7:
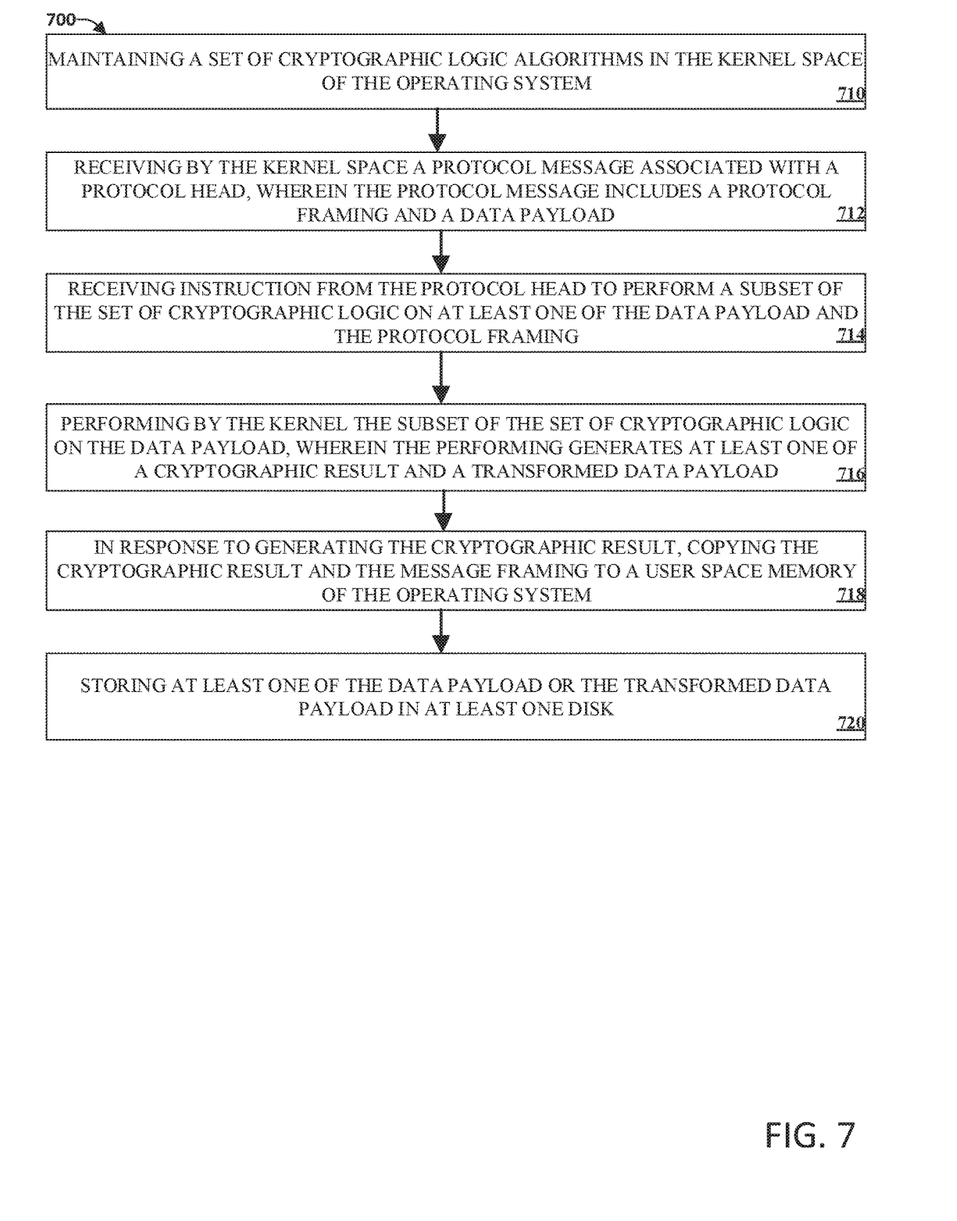
FIG. 7 illustrates an example method for zero-copy of a data payload when receiving a protocol message by generating cryptographic results in the kernel in accordance with implementations of this disclosure.

FIGS. 5-7 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with one or more of the following methods.

FIG. 5 illustrates an example method for zero-copy of a data payload for sending to a client by generating cryptographic results in the kernel in accordance with implementations of this disclosure. At 510, a set of cryptographic algorithms can be maintained in the kernel space of the operating system. In one implementation, the set of cryptographic logic algorithms include at least one of AES-128-CCM, AES-128-CMAC, AES-128-GCM, SHA-256-HMAC, and MD5. At 512, a first protocol head in the user space of the operating system can receive a request to send a data payload over a data socket. At 514, the data payload can be read from at least one disk to a kernel space memory.

At 516, the protocol head can instruct the kernel to perform a subset of the set of cryptographic logic on the data payload in the kernel space memory. It can be appreciated that the instructions can include instructions for what portions of the data payload are targets for the cryptographic algorithm(s).

At 518, the kernel can perform the subset of the set of cryptographic logic on the data payload, wherein the performing generates at least one of a cryptographic result and a transformed data payload. In one implementation, the data payload is not copied to a user space memory when the performing the subset of the set of cryptographic logic and generating the message framing. At 520, in response to generating the cryptographic result, the cryptographic result can be copied to a user space memory of the operating system.

At 522, a message framing can be generated by the protocol head, wherein the message framing includes at least the cryptographic result, and wherein the message framing is stored in the user space memory. In one implementation, a second cryptographic result can be generated in the kernel space memory based on the message framing and one of the data payload or the transformed data payload. For example, a protocol specification may require that the entire protocol message (e.g., the protocol framing and the data payload) have a cryptographic algorithm applied to it as a part of encryption, decryption, or hashing.

At 524, the kernel can be instructed to send a protocol message based on a user space supplied vector wherein the user space supplied vector includes the message framing in the user space memory and one of the data payload in the kernel space memory or the transformed data payload in the kernel space memory.

At 526, the protocol message can be assembled in kernel memory space based on the user space supplied vector. In one implementation, generating the protocol message in kernel space includes copying the message framing in the user space memory to the kernel space memory. At 528, the protocol message can be sent over the data socket.

FIG. 6 illustrates an example method for zero-copy of two data payloads for sending by two different protocols in parallel by generating cryptographic results in the kernel in accordance with implementations of this disclosure. At 610, a set of cryptographic algorithms can be maintained in the kernel space of the operating system. At 612, a first protocol head in the user space of the operating system can receive a request to send a data payload over a data socket. At 614, the data payload can be read from at least one disk to a kernel space memory.

At 616, the protocol head can instruct the kernel to perform a subset of the set of cryptographic logic on the data payload in the kernel space memory.

At 618, the kernel can perform the subset of the set of cryptographic logic on the data payload, wherein the performing generates at least one of a cryptographic result and a transformed data payload. At 620, in response to generating the cryptographic result, the cryptographic result can be copied to a user space memory of the operating system.

At 622, a message framing can be generated by the protocol head, wherein the message framing includes at least the cryptographic result, and wherein the message framing is stored in the user space memory.

At 624, a second cryptographic result can be generated in kernel space memory based on the message framing and one of the data payload or the transformed data payload.

At 626, the kernel can be instructed to send a protocol message based on a user space supplied vector wherein the user space supplied vector includes the message framing in the user space memory, the second cryptographic result, and one of the data payload in the kernel space memory or the transformed data payload in the kernel space memory.

At 628, the protocol message can be assembled in kernel memory space based on the user space supplied vector. In one implementation, assembling the protocol message in kernel space includes copying the message framing in the user space memory to the kernel space memory. At 630, the protocol message can be sent over the data socket.

FIG. 7 illustrates an example method for zero-copy of a data payload when receiving a protocol message by generating cryptographic results in the kernel in accordance with implementations of this disclosure.

At 710, a set of cryptographic algorithms can be maintained in the kernel space of the operating system.

At 712, the kernel space can receive a protocol message associated with a protocol head, wherein the protocol message includes a protocol framing and a data payload. It can be appreciated that the kernel space can receive the protocol message from a protocol client across a data socket. In one implementation, the protocol framing and the data payload may be encrypted together as a single encrypted message whereby the parts cannot be discerned until the message is decrypted.

At 714, the kernel can receive instructions from the protocol head to perform a subset of the set of cryptographic logic on at least one of the data payload and the protocol framing.

At 716, the kernel can perform the subset of the set of cryptographic logic on the data payload, wherein the performing generates at least one of a cryptographic result and a transformed data payload.

At 718, in response to generating the cryptographic result, the cryptographic result and the message framing can be copied to a user space memory of the operating system.

At 720, at least one of the data payload or the transformed data payload can be stored in at least one disk. It can be appreciated that this is an option step of the method as not all data is required to be written to disk. For example, some data may be overwritten prior to be written to disk, some data may get stored in a journal before being eventually written to disk in a journal flush, etc.

Figure 8:
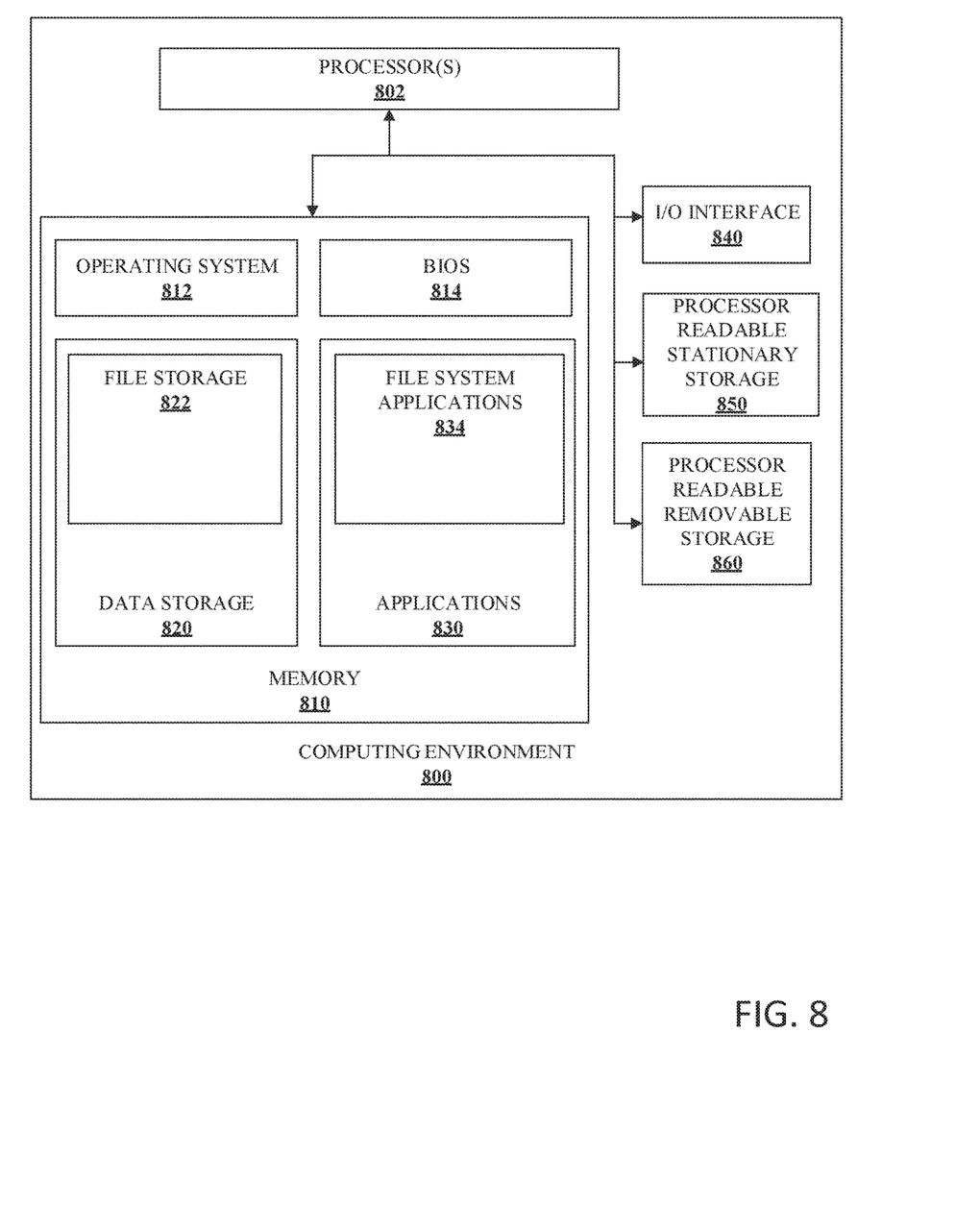
FIG. 8 illustrates an example block diagram of a computing environment in accordance with implementations of this disclosure.

FIG. 8 illustrates an example block diagram of a computing environment 800 in accordance with implementations of this disclosure.

Computing environment 800 includes processor 802 which communicates with memory 810 via a bus. Computing environment 800 also includes input/output interface 840, processor-readable stationary storage device(s) 850, and processor-readable removable storage device(s) 860. Input/output interface 840 can enable computing environment 800 to communicate with other nodes, mobile devices, network devices, and the like. Processor-readable stationary storage device 850 may include one or more devices such as an electromagnetic storage device (hard disk), solid state hard disk (SSD), hybrid of both an SSD and a hard disk, and the like. In some configurations, a computing environment may include many storage devices. Also, processor-readable removable storage device 860 enables processor 802 to read non-transitive storage media for storing and accessing processor-readable instructions, modules, data structures, and other forms of data. The non-transitive storage media may include Flash drives, tape media, floppy media, disc media, and the like.

Memory 810 may include Random Access Memory (RAM), Read-Only Memory (ROM), hybrid of RAM and ROM, and the like. As shown, memory 810 includes operating system 812 and basic input/output system (BIOS) 814 for enabling the operation of computing environment 800. In various embodiments, a general-purpose operating system may be employed such as a version of Unix, LINUX™, a specialized server operating system such as Microsoft's Windows Server™ and Apple Computer's IoS Server™, or the like. Operating system 812 can partition portions of memory 810 including specialized memory offering performance advantages such as high bandwidth, low latency, flash memory to a kernel space of the operating system and a user space of the operating system. It can be appreciated that in general user space applications cannot directly access kernel space memory. Data storage 820 may reside within memory 810 as well, storing file storage 822 data.

Applications 830 may include processor executable instructions which, when executed by computing environment 800, transmit, receive, and/or otherwise process messages, audio, video, and enable communication with other networked computing devices. Examples of application programs include database servers, file servers, calendars, transcoders, and so forth. Applications 830 may include, for example, file system applications 834, including protocol applications or protocol heads for SMB, NFS, HDFS, object protocols, etc. In addition, separate protocol applications can exist for differing versions of a single protocol such as SMB2 and SMB3.

Human interface components (not pictured), may be remotely associated with computing environment 800, which can enable remote input to and/or output from computing environment 800. For example, information to a display or from a keyboard can be routed through the input/output interface 840 to appropriate peripheral human interface components that are remotely located. Examples of peripheral human interface components include, but are not limited to, an audio interface, a display, keypad, pointing device, touch interface, and the like.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present disclosure. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A computer implemented method, implemented using a hardware processor, for avoiding data copying between a kernel space and a user space of an operating system comprising:
   maintaining a set of cryptographic algorithms in the kernel space of the operating system;
   receiving by a first protocol head in the user space of the operating system a request to send a data payload over a data socket;
   reading the data payload from at least one disk to a kernel space memory;
   instructing the kernel by the protocol head to perform a subset of the set of cryptographic logic on the data payload in the kernel space memory;
   performing by the kernel the subset of the set of cryptographic logic on the data payload, wherein the performing generates at least one of a cryptographic result and a transformed data payload;
   in response to generating the cryptographic result, copying the cryptographic result to a user space memory of the operating system;
   generating a message framing by the protocol head, wherein the message framing includes at least the cryptographic result, and wherein the message framing is stored in the user space memory;
   instructing the kernel to send a protocol message based on a user space supplied vector wherein the user space supplied vector includes the message framing in the user space memory and one of the data payload in the kernel space memory or the transformed data payload in the kernel space memory;
   assembling the protocol message in kernel memory space based on the user space supplied vector; and
   sending, using the hardware processor, the protocol message over the data socket.

2. The method of claim 1, further comprising:
   generating a second cryptographic result in the kernel space memory based on the message framing and one of the data payload or the transformed data payload, wherein the instructing the kernel to generate the vectored output is further based on the second cryptographic result.

3. The method of claim 1, wherein the data payload is not copied to a user space memory when the performing the subset of the set of cryptographic logic and generating the message framing.

4. The method of claim 1, wherein the set of cryptographic logic algorithms include at least one of AES-128-CCM, AES-128-CMAC, AES-128-GCM, SHA-256-HMAC, and MD5.

5. The method of claim 1, wherein generating the vectored output in kernel space includes copying the message framing in the user space memory to the kernel space memory.

6. The method of claim 1, further comprising:
   receiving by a second protocol head in the user space of the operating system a second request to send a second data payload over a second data socket;
   reading the second data payload from the at least one disk to the kernel space memory;
   instructing the kernel by the second protocol head to perform a second subset of the set of cryptographic logic on the second data payload;
   performing the second subset of the set of cryptographic logic on the second data payload, wherein the performing generates at least one of a second cryptographic result and a second transformed data payload;
   in response to generating the second cryptographic result, copying the second cryptographic result to the user space memory of the operating system;
   generating a second message framing by the second protocol head, wherein the second message framing includes at least the second cryptographic result, and wherein the second message framing is stored in the user space memory;
   instructing the kernel to send a second protocol message based on a second user space supplied vector wherein the second user space supplied vector includes the second message framing in the user space memory and one of the second data payload in the kernel space memory or the second transformed data payload in the kernel space memory;
   assembling the second protocol message in kernel memory space based on the second user space supplied vector; and
   sending the second protocol message over the second data socket.

7. The method of claim 6, wherein the subset and the second subset are different.

8. A system for avoiding data copying between a kernel space and a user space of an operating system comprising at least one storage device and at least one hardware processor configured to:

maintain a set of cryptographic algorithms in the kernel space of the operating system;

receive by a first protocol head in the user space of the operating system a request to send a data payload over a data socket;

read the data payload from at least one disk to a kernel space memory;

instruct the kernel by the protocol head to perform a subset of the set of cryptographic logic on the data payload in the kernel space memory;

perform by the kernel the subset of the set of cryptographic logic on the data payload, wherein the performing generates at least one of a cryptographic result and a transformed data payload;

in response to generating the cryptographic result, copy the cryptographic result to a user space memory of the operating system;

generate a message framing by the protocol head, wherein the message framing includes at least the cryptographic result, and wherein the message framing is stored in the user space memory;

instruct the kernel to send a protocol message based on a user space supplied vector wherein the user space supplied vector includes the message framing in the user space memory and one of the data payload in the kernel space memory or the transformed data payload in the kernel space memory;

assemble the protocol message in kernel memory space based on the user space supplied vector; and send the protocol message over the data socket.

9. The system of claim 8 further configured to:

generate a second cryptographic result in the kernel space memory based on the message framing and one of the data payload or the transformed data payload, wherein the instructing the kernel to generate the vectored output is further based on the second cryptographic result.

10. The system of claim 8, wherein the data payload is not copied to a user space memory when the performing the subset of the set of cryptographic logic and generating the message framing.

11. The system of claim 8, wherein the set of cryptographic logic algorithms include at least one of AES-128-CCM, AES-128-CMAC, AES-128-GCM, SHA-256-HMAC, and MD5.

12. The system of claim 8, wherein generating the vectored output in kernel space includes copying the message framing in the user space memory to the kernel space memory.

13. The system of claim 8 further configured to:

receive by a second protocol head in the user space of the operating system a second request to send a second data payload over a second data socket;

read the second data payload from the at least one disk to the kernel space memory;

instruct the kernel by the second protocol head to perform a second subset of the set of cryptographic logic on the second data payload;

perform the second subset of the set of cryptographic logic on the second data payload, wherein the performing generates at least one of a second cryptographic result and a second transformed data payload;

in response to generating the second cryptographic result, copy the second cryptographic result to the user space memory of the operating system;

generate a second message framing by the second protocol head, wherein the second message framing includes at least the second cryptographic result, and wherein the second message framing is stored in the user space memory;

instruct the kernel to send a second protocol message based on a second user space supplied vector wherein the second user space supplied vector includes the second message framing in the user space memory and one of the second data payload in the kernel space memory or the second transformed data payload in the kernel space memory;

assemble the second protocol message in kernel memory space based on the second user space supplied vector; and send the second protocol message over the second data socket.

14. The system of claim 13, wherein the subset and the second subset are different.

15. A non-transitory computer readable medium with program instructions stored thereon executed by a hardware processor to perform the following acts:

maintaining a set of cryptographic algorithms in the kernel space of the operating system;

receiving by a first protocol head in the user space of the operating system a request to send a data payload over a data socket;

reading the data payload from at least one disk to a kernel space memory;

instructing the kernel by the protocol head to perform a subset of the set of cryptographic logic on the data payload in the kernel space memory;

performing by the kernel the subset of the set of cryptographic logic on the data payload, wherein the performing generates at least one of a cryptographic result and a transformed data payload;

in response to generating the cryptographic result, copying the cryptographic result to a user space memory of the operating system;

generating a message framing by the protocol head, wherein the message framing includes at least the cryptographic result, and wherein the message framing is stored in the user space memory;

instructing the kernel to send a protocol message based on a user space supplied vector wherein the user space supplied vector includes the message framing in the user space memory and one of the data payload in the kernel space memory or the transformed data payload in the kernel space memory;

assembling the protocol message in kernel memory space based on the user space supplied vector; and sending the protocol message over the data socket.

16. The non-transitory computer readable medium of claim 15, with program instructions stored thereon to further perform the following acts:

generating a second cryptographic result in the kernel space memory based on the message framing and one of the data payload or the transformed data payload, wherein the instructing the kernel to generate the vectored output is further based on the second cryptographic result.

17. The non-transitory computer readable medium of claim 15, wherein the data payload is not copied to a user space memory when the performing the subset of the set of cryptographic logic and generating the message framing.

18. The non-transitory computer readable medium of claim 15, wherein the set of cryptographic logic algorithms include at least one of AES-128-CCM, AES-128-CMAC, AES-128-GCM, SHA-256-HMAC, and MD5.

19. The non-transitory computer readable medium of claim 15, wherein generating the vectored output in kernel space includes copying the message framing in the user space memory to the kernel space memory.

20. The non-transitory computer readable medium of claim 15, with program instructions stored thereon to further perform the following acts:

receiving by a second protocol head in the user space of the operating system a second request to send a second data payload over a second data socket;

reading the second data payload from the at least one disk to the kernel space memory;

instructing the kernel by the second protocol head to perform a second subset of the set of cryptographic logic on the second data payload;

performing the second subset of the set of cryptographic logic on the second data payload, wherein the performing generates at least one of a second cryptographic result and a second transformed data payload;

in response to generating the second cryptographic result, copying the second cryptographic result to the user space memory of the operating system;

generating a second message framing by the second protocol head, wherein the second message framing includes at least the second cryptographic result, and wherein the second message framing is stored in the user space memory;

instructing the kernel to send a second protocol message based on a second user space supplied vector wherein the second user space supplied vector includes the second message framing in the user space memory and one of the second data payload in the kernel space memory or the second transformed data payload in the kernel space memory;

assembling the second protocol message in kernel memory space based on the second user space supplied vector; and sending the second protocol message over the second data socket.

* * * * *